C. SHEA.

Compensating Spring.

No. 3,983. Reissued May 17. 1870.

Witnesses:
Alex F. Roberts
Geo. N. Mabee

Inventor:
C. Shea
per Munn & Co
Attorneys.

United States Patent Office.

CHARLES SHEA, OF NEWARK, NEW JERSEY.

*Letters Patent No.* 95,736, *dated October* 12, 1869; *reissue No.* 3,983, *dated May* 17, 1870.

DIVISION B.

IMPROVED COMPENSATING SPRING.

The Schedule referred to in these Letters Patent and making part of the same.

*To all whom it may concern:*

Be it known that I, CHARLES SHEA, of Newark, in the county of Essex and State of New Jersey, have invented a new and improved Compensating Carriage-Spring; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
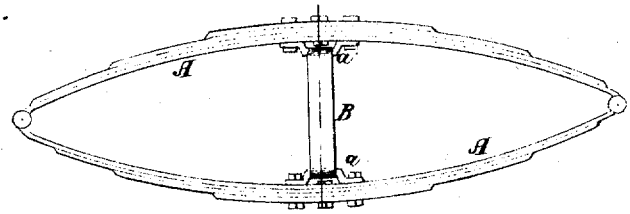
Figure 1 represents a side view of an elliptic spring, provided with my improved compensating spring.
Figure 2:
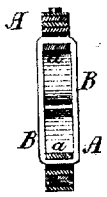
Figure 2 is a vertical transverse section of the same.

The object of this invention is to so construct and prepare elliptic wagon or carriage-springs that the same may not be impaired by the shocks or rebounds of the wagon or carriage-bodies.

The invention consists in applying to the opposite sides or pieces of an elliptic spring, an elastic strap or loop, which is strained when the spring is expanded, and slackened when the same is compressed. Thus, when the pressure is on the main or elliptic spring, it is off the strap or compensating spring, and when on the latter, it is off the former.

It is well known that carriages and wagons, when loaded, are not as liable to break their springs as they are when not loaded, because in the latter case the great shock produced when one wheel drops into a depression will cause a rebound of the carriage-body injurious to the spring.

By my invention these defects are entirely overcome, as the counteracting straps or loops keep the main elliptic springs so balanced that the same cannot become overstrained when the weight on them is suddenly thrown off, with a tendency of stretching them by expansion.

A, in the drawing, represents an elliptic carriage-spring of such suitable construction as is usually employed on wheeled vehicles.

B is the compensating spring. The same is made in form of a strap, loop, or ring, made of rubber or other suitable elastic material, and fitted through or fastened to the ears *a a*, that are secured to the inner sides of the spring, opposite each other, as shown.

The strap, loop, or ring B is so applied that it will be stretched when the spring A is expanded, and slackened when the same is compressed.

Having thus described my invention,

I claim as new and desire to secure by Letters Patent—

The compensating springs E E, connected with the bearing-springs B B by means of the rod D and straps F F to the axle and frame of a carriage, substantially as described.

CHARLES SHEA.

Witnesses:

GEO. W. MABEE,

ALEX. F. ROBERTS.